UNITED STATES PATENT OFFICE.

JULIUS HAAKE, OF RADEBEUL, NEAR DRESDEN, GERMANY.

PAINT.

SPECIFICATION forming part of Letters Patent No. 473,391, dated April 19, 1892.

Application filed December 31, 1890. Serial No. 376,390. (No specimens.)

*To all whom it may concern:*

Be it known that I, JULIUS HAAKE, manufacturer, a citizen of Germany, residing at Radebeul, near Dresden, in the Kingdom of Saxony, Germany, have invented certain new and useful Improvements in Paints of all Tinges, which can immediately be used without any medium, only mixed by stirring with cold water, and method of their preparation; and I do hereby declare the following to be a full, clear, and exact description of the invention, such as will enable others skilled in the art to which it appertains to make and use the same.

It is the purpose of my invention to provide a paint of any color or tint which shall be capable of immediate mixture and application without requiring a preliminary process of treatment in preparing and mingling the vehicle with the coloring-matter.

It is my object, also, to provide a paint-stuff which may be prepared for application by simply mingling it with cold water, which will neither scale or peel off nor rub away and fall as a dry powder from the surface upon which it is laid, which may be used in executing all kinds of work and at all seasons of the year without danger of becoming thick or gelatinous at low temperatures, which will not deteriorate by dampness, will be free from unpleasant odors, and which can be kept in a dry state ready for mixing and immediate application in any climate and for any length of time.

It is my purpose, also, to provide a vehicle for paints, consisting of size of the kind hereinafter described, which is mingled with the coloring-matter either in a dry and pulverized or divided condition, giving a body which requires nothing but cold water to prepare it for immediate use, the surplus of mixed and prepared paint left after the work is done being capable of preservation by permitting the water to evaporate therefrom, leaving a residue of coloring-matter and size, which can again be mingled with water and used.

It is my purpose, finally, to provide a binding material for ultramarine blue and green and burnt sienna which will hold said colors firmly and permanently without any tendency to crack, peel, or rub off.

My invention consists of the novel compound for paints hereinafter fully described, and then more particularly pointed out and defined in the claim which concludes this specification.

To enable others skilled in the art to make, compound, and use my said invention, I will proceed to describe the same in detail, the process of compounding the paint compound being substantially as follows:

I extract from the husks of rye and from potato-starch the dextrine which is contained in each, using for this purpose any of the known processes of extraction. Two parts of the dextrine obtained from the rye is mingled with one part of that obtained from the potato-starch, until twenty-five parts, by weight, thereof are obtained in a dry state, which are then mingled with seventy-five parts of the dry color. For this purpose the dextrine is preferably pulverized or reduced to a finely-divided state, and, if desired, it may be ground, together with the dry color, in any apparatus suitable for the purpose. When the color and the size, the latter prepared and mingled in the manner set forth, are thoroughly mixed in the proportions specified, the paint is ready for use upon the addition of a little water, by which it is prepared for immediate use. It may be kept in its dry state for any length of time, in any climate, and at any temperature without deterioration from heat, cold, or moisture. The paint, when applied, is hard, permanent, and tenacious, giving a smooth velvety surface, is capable of being applied directly upon surfaces covered by other paint without scraping or otherwise preparing the latter, is not attacked by moisture or temperature, and can be mixed with cold water and used at once without regard to the season of the year, as the paint is not rendered viscid or otherwise affected by low temperatures.

I have discovered that for the purpose of my invention there is a very important difference between the dextrine obtained from potato-starch and that from rye. The former possesses a yellow tint, which acts very injuriously upon delicate colors, and a pure white can never be obtained. Dextrine from rye, however, is perfectly white or colorless and may be used safely with any delicate tint. The dextrine from potato-starch is more brittle than that from rye, and the colors containing the former are always liable to fly or shale off from the surfaces to which they are applied. With the dextrine from rye this is not the case. All dextrines, excepting that from rye, must be boiled before the colors can be mixed with them. Dextrine from rye only can be used with cold water.

Colors mingled with dextrine from potato-starch are very viscid, gelatinous, and sticky; but those prepared by intermixture with dextrine obtained from rye remain liquid and smooth and produce a surface of marked uniformity.

Heretofore and prior to my invention colors have been mingled with gum, starch, size, tapioca-flour, and pulverized glue, as well as farinaceous substances, and to these I make no claim.

As I employ only one part in three of dextrine from potato-starch, I do not obtain the injurious effects referred to above, but secure all the advantages of the dextrine from rye, which I have discovered to possess characteristics especially adapting it to the use I have described. I obtain the dextrine from rye by any of the ordinary methods which are well known to the art.

The method of preparation I have usually followed is as follows: I take the thin skins of the grain, including the palea, and reduce the same to powder in a suitable grinding-mill. The powder thus formed is passed through silk-gauze of suitable fineness to separate the woody fiber and larger granulations. An almost impalpable powder is thus obtained, which consists almost entirely of starch, which is separated by washing in substantially the same manner as potato-starch and converted into dextrine either by subjecting it to heat alone for a suitable time or by moistening with water which has been acidulated by nitric acid and then heating for a suitable time to about 240° Fahrenheit, both methods being familiar to those acquainted with the art. These methods, however, do not impart to the dextrine from rye the yellow color imparted to dextrine from potato-starch by the first method, said yellow tint being usually found in the commodity known as "British gum," which is prepared by heating potato-starch to about 400° Fahrenheit for an hour or two.

What I claim is—

The paint or color compound herein described, the same consisting of a size composed of dextrine extracted from the husks of rye and from potato-starch, the two being mingled in the proportion of two parts of the former to one part of the latter, and a color mixed with the two dextrines in the proportion of seventy-five parts of color to twenty-five parts of the two dextrines, substantially as described.

In testimony whereof I affix my signature in presence of two witnesses.

JULIUS HAAKE.

Witnesses:
 CARL FR. KEICHELT,
 PAUL DRUCKMÜLLER.